United States Patent [19]

Terence et al.

[11] Patent Number: 4,844,471

[45] Date of Patent: Jul. 4, 1989

[54] GOLF BALL CORE COMPOSITION INCLUDING DIALKYL TIN DIFATTY ACID

[75] Inventors: Melvin Terence, Somers, Conn.; Alfred I. LaRosa, Chicopee, Mass.

[73] Assignee: Spalding & Evenflo Companies, Inc., Tampa, Fla.

[21] Appl. No.: 137,648

[22] Filed: Dec. 24, 1987

[51] Int. Cl.$^4$ .................... A63B 37/02; A63B 37/06; C08L 9/00

[52] U.S. Cl. .................................. 273/220; 273/230; 524/430; 524/432; 524/908; 525/123; 525/274

[58] Field of Search ................ 273/228, 230; 525/274, 525/123; 524/908, 430, 432

[56] References Cited

U.S. PATENT DOCUMENTS 4,076,255  2/1978  Moore et al. ................ 524/423

Primary Examiner—Allan M. Lieberman
Attorney, Agent, or Firm—Donald R. Bahr

[57] ABSTRACT

Golf balls exhibiting an improved coefficient of restitution are obtained by the inclusion of dialkyl tin difatty acids in the core formulation.

24 Claims, No Drawings

GOLF BALL CORE COMPOSITION INCLUDING DIALKYL TIN DIFATTY ACID

This invention relates to golf balls. More particularly, this invention relates to multi-layered molded golf balls.

In the prior art, it has been rather standard practice throughout the golfing industry to provide unitary golf balls of multi-ply construction generally consisting of a cover comprising an ionic copolymer and a center part or core containing cis-polybutadiene or other elastomers. Golf balls produced with such a unitary construction are disclosed in U.S. Pat. No. 3,313,545, issued Apr. 11, 1967; U.S. Pat. No. 3,438,933, issued April 1969; and U.S. Pat. No. 4,625,964, issued Dec. 2, 1986, among others.

There are several distinct advantages of homogenous, unitary construction for golf balls, as contrasted with the wound golf balls of the earlier art. Unitary golf balls can be produced with a perfect center of gravity and thus, exhibit excellent aerodynamic properties, superior roll and trueness of flight. Such golf balls are highly resistant to cutting and are practically indestructible during use in normal play. The balls return to round even when severely distorted and maintain their superior flight characteristics after extended use. Further, homogenous unitary golf balls may be manufactured with better quality than conventional wound balls.

In contrast to the conventionally covered wound golf balls, unitary balls maintain their playing characteristics throughout widely varying temperature ranges, possess an excellent shelf life and will not water log. In those situations where the paint on unitary golf balls becomes worn or damaged, the balls may be readily reclaimed by removing or stripping off the old paint and repainting. By contrast, conventional wound balls seldom last long enough to allow repainting.

While such golf balls have found wide acceptance, the advantages gained in increased durability are offset to a large degree by decreased impact resilience or coefficient of restitution.

It is an object of the present invention to provide unitary golf balls exhibiting excellent durability and possessing an improved coefficient of restitution.

In accordance with the present invention, there is provided a unitary golf ball comprising a solid core and a cover for covering the solid core, the solid core comprising an elastomer, at least one metallic salt of an unsaturated carboxylic acid, a free radical initiator and from about 0.1 to about 10 parts by weight, based on 100 parts rubber, of a dialkyl tin difatty acid, and the cover comprising one or more layers of ionomer resin-based compositions.

The core compositions of the present invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to 500,000 is employed.

The unsaturated carboxylic acid component of the core composition is the reaction product of the selected carboxylic acid and an oxide or carbonate of a metal such as zinc, magnesium, barium, calcium, lithium, sodium, potassium, cadmium, lead and the like, and mixtures thereof. Preferably, the oxides of polyvalent metals are employed. Most preferably, zinc oxide is utilized.

Examples of unsaturated carboxylic acids which find utility in producing the present core compositions are acrylic acid, methacrylic acid, itaconic acid, crotonic acid, sorbic acid and the like, and mixtures thereof. Preferably, the carboxylic acid component is either acrylic or methacrylic acid. Usually, from about 20 to about 50, preferably from about 25 to about 40 parts by weight of the metal salt based on 10 parts elastomer is included in the core composition.

The dialkyl tin difatty acid component is selected from those compounds of the formula

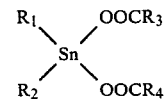

wherein $R_1$ and $R_2$ are lower alkyl having from 2 to 8 carbon atoms and $R_3$ and $R_4$ are alkyl having from 7 to 17 carbon atoms. Preferably, $R_1$ and $R_2$ are each butyl radicals and $R_3$ and $R_4$ are each 11 carbon atoms in length.

Exemplary of suitable tin compounds are dibutyl tin dilaurate, dibutyl tin bis ethylhexanoate, dibutyl tin dioleate and the like. Preferably, the tin compound employed is dibutyl tin dilaurate.

As previously indicated, the tin compound is included in the core composition in an amount of from about 0.1 to about 10.0 parts by weight, preferably, in an amount of from about 0.2 to about 2.0 parts by weight based on 100 parts elastomer.

The free radical initiator included in the core composition is any known polymerization initiator which decomposes during the cure cycle. The amount of the selected initiator present is dictated only by the requirements of catalytic activity as a polymerization initiator. Suitable initiators for use in the present invention include peroxides, persulfates, azo compounds, hydrazines and the like. Peroxides such as dicumyl peroxide, n-butyl 4,4-bis (butylperoxide) valerate, 1,1-bis-(t-butylperoxy)-3,3,5-trimethylcyclohexane, di-t-butylperoxide and 3,5-di-(t-butylperoxy)-2,5 dimethylhexane and the like are readily commercially available and conveniently used, generally in amounts of from about 0.1 to about 10.0 and preferably in amount of from about 0.3 to about 3.0 parts by weight based on 100 parts elastomer.

The core compositiins of the present invention may additionally contain any other suitable and compatible modifying ingredients including, but not limited to, fillers, metal oxides, fatty acids, and diisocyanates.

As fillers, any known and conventional filler material, or mixtures thereof, may be used. Such fillers should be in finely divided form, as for example, of a size generally less than about 30 mesh and preferably less than about 100 mesh U.S. standard screen size. Suitable fillers include silica, silicates, zinc oxide, carbon black, cork, titania, cotton flock, cellulose flock, leather fiber, plastic and/or leather flour, asbestos, glass fibers, metal carbonates, talc, graphite fibers and the like. Particularly useful as a filler is the oxide or carbonate of the cation present in the selected metal carboxylate component.

The amount of filler included in the core composition is primarily dictated by weight restrictions and is preferably from about 10 to about 100 parts by weight based on 100 parts elastomer.

Fatty acids may also be included in the compositions, functioning to improve moldability and processing. Generally, fatty acids having from about 10 to about 40 carbon atoms are used, preferably those having from about 15 to about 20 atoms. Exemplary of suitable fatty acids are stearic acid, linoleic acid, oleic acid and the like. When employed, the fatty acids, or mixtures thereof, are included in the core composition in amounts of from about 1 to about 15, more preferably in an amount of from about 2 to about 10, and most preferably in an amount of from about 2 to about 5 parts by weight based on 100 parts elastomer. It is preferred that the core compositions include stearic acid as the fatty acid adjuvant in an amount of from about 2 to about 5 parts by weight based on 100 parts elastomer.

Diisocyanates may also be optionally included in the core compositions for the purpose of increasing the coefficient of restitution. When utilized, the diisocyanates, or mixtures thereof, are included in amounts of from about 0.2 to about 5.0 parts by weight based on 100 parts elastomer. Exemplary of suitable diisocyanate are 4,4-diphenylmethane diisocyanate and other polyfunctional isocyanates and the like. Preferably, 4,4-diphenylmethane diisocyanate is employed as the diisocyanate in an amount of from about 0.2 to about 5.0 parts by weight based on 100 parts elastomer.

In producing golf ball cores utilizing the present compositions, the ingredients may be intimately mixed using, for example, two roll mills or a Banbury mixer until the composition is uniform, usually for a period of from about 5 to about 20 minutes. The sequence of addition of components is not critical. A blending sequence is as follows.

Elastomer, filler, zinc salt, metal oxide, and the tin compound are blended for about 7 minutes in an internal mixer such as a Banbury mixer. As a result of shear during mixing the temperature rises to about 200° F. The initiator and diisocyante are then added and the mixing continued until the temperature reaches about 220° F. whereupon the batch is discharged onto a two roll mill, mixed for about one minute and sheeted out.

The sheet is then placed in a Barwell preformer and slugs are produced. The slugs are then subjected to compression molding at about 320° F. for about 14 minutes. After molding and cooling, the cooling effected at room temperature for about 4 hours, the molded cores are subjected to a centerless grinding operation whereby a thin skin of the molded core is removed to produce a round core having a diameter of 1.545 inches. The mixing is directly conducted in such a manner that the composition does not reach incipient polymerization temperatures during the blending of the various components.

In order to promote good dispersion, the metal carboxylate may be formed in situ from the selected metal oxide or carbonate and the corresponding acid. The unsaturated carboxylic acid may be added to a portion of a metal oxide-rubber blend, followed by the addition of the remaining metal oxide-rubber blend and optional components, with subsequent addition of the free radical initiator.

Usually the curable component of the composition will be cured by heating the composition at elevated temperatures on the order of from about 275° F. to about 350° F., preferably from about 295° F. to about 325° F., with molding of the composition effected simultaneously with the curing thereof. The composition can be formed into a core structure by using any one of a number of suitable molding techniques, e.g., injection, compression or transfer molding procedures. When the composition is cured by the application of heat, the time required for curing will normally be of short duration, generally from about 10 to about 20 minutes, depending upon the particular curing agent used. Those of ordinary skill in the art relating to free radical curing agents for polymers are conversant with adjustments of cure times and temperatures required to effect optimum results with any free radical generating agent.

After molding, the core is removed from the mold and the surface thereof, preferably treated to facilitate adhesion thereof to the covering compositions. Surface treatment can be effected by any of the several techniques known in the art, such as corona discharge, ozone treatment, sand blasting and the like. Preferably, surface treatment is effected by grinding with an abrasive wheel.

The core is converted into a golf ball by providing at least one layer of covering composition thereon, ranging in thickness from about 0.050 to about 0.250 inch and preferably from about 0.060 to about 0.090 inch. The cover composition is preferably one wherein the primary constituent is either a copolymer of ethylene and acrylic acid or a copolymer of ethylene and methacrylic acid neutralized to from about 15 to about 60 percent with mono or polyvalent metals such as, for example, sodium, potassium, lithium, cadmium, zinc and magnesium.

The ionic copolymers used to produce the cover compositions may be made according to known procedures, such as those shown in U.S. Pat. No. 3,421,766 or British Pat. No. 963,380, with neutralization effected according to procedures disclosed in Canadian Pat. Nos. 674,595 and 713,631, wherein the olefin and unsaturated carboxylic acid are reacted to yield a copolymer having the acid units randomly distributed along the polymer chain. The ionic copolymer comprises one or more $\alpha$-olefins and from about 9 to about 15 weight percent of the selected unsaturated carboxylic acid.

At least about 18 percent of the carboxylic acid groups of the copolymer are neutralized by the selected metal ion or ions.

Suitable olefins for use in preparing the ionomeric resins include, but are not limited to, ethylene, propylene, butene-1, hexene-1 and the like. Unsaturated carboxylic acids include, but are not limited to acrylic acid, methacrylic acid, ethacrylic acid, a-chloroacrylic acid, crotonic acid, maleic acid, fumaric acid, itaconic acid and the like. Preferably, the ionomeric resin is a neutralized copolymer of ethylene with acrylic and/or methacrylic acid.

The golf ball can be formed utilizing any one of the methods known to the art for covering solid cores. For example, a core may be placed in the center of a golf ball mold, and the cover composition injected into and retained in the space for a period of time at a mold temperature of from about 40° F. to about 120° F.

Alternatively, the cover composition may be injection molded at about 300° F. to about 450° F. into smooth-surfaced hemispherical shells, a core and two such shells placed in a dimpled golf ball mold and unified at temperatures on the order of from about 100° F. to about 200° F.

The golf ball produced is then painted and marked, painting being effected by spraying. Alternatively, the pigment may be incorporated in the cover composition.

The cores produced from the present compositions are characterized by a PGA compression of about 90 to about 100, a rebound of at least about 70 percent and specific gravities on the order of from about 1.10 g/cc and 1.20 g/cc.

The improved golf balls produced using the cores of the present invention are characterized by increased coefficient of restitution.

The invention is further described in the following examples wherein the parts are by weight unless otherwise specified.

EXAMPLES

Using the ingredients tabled below, golf ball cores having a finished diameter of 1.545 inches were produced by compression molding and subsequent removal of a surface layer by grinding. Each core was formulated using 100 parts high cis content polybutadiene. In the examples, the amounts of remaining ingredients are expressed in parts by weight, and the degrees of coefficient of restitution and compression achieved set forth. The data for these examples are the averages for twelve cores which were produced for each example.

| Ingredients | EXAMPLES | | | |
|---|---|---|---|---|
| | 1 | 2 | 3 | 4 |
| Zinc Diacrylate | 34.5 | 34.5 | 34.5 | 34.5 |
| Zinc Oxide | 5.0 | 5.0 | 5.0 | 5.0 |
| Stearic Acid | 5.0 | 5.0 | 5.0 | 5.0 |
| Ground Flash | 16.0 | 16.0 | 16.0 | 16.0 |
| Barytes | 14.5 | 14.5 | 14.5 | 14.5 |
| 4,4′-Diphenylmethane Diisocyanate | 1.0 | 1.0 | 1.0 | 1.0 |
| n-Butyl 4,4-Bis-(Butylperoxide) Valerate | 2.0 | 2.0 | 2.0 | 2.0 |
| Dibutyl Tin Dilaurate | — | .05 | 1.0 | 2.0 |
| Weight gms. | 38.3 | 38.3 | 38.4 | 38.4 |
| Compression | 50 | 50 | 50 | 50 |
| Coefficient of Restitution | 0.797 | 0.796 | 0.799 | 0.798 |

| Ingredients | EXAMPLES | | | | |
|---|---|---|---|---|---|
| | 5 | 6 | 7 | 8 | 9 |
| Zinc Diacrylate | 31 | 31 | 31 | 31 | 31 |
| Ground Flash | 18 | 18 | 18 | 18 | 18 |
| Zinc Oxide | 17 | 17 | 17 | 17 | 17 |
| Zinc Stearate | 20 | 20 | 20 | 20 | 20 |
| n-Butyl 4, 4-Bis-(Butylperoxide) Valerate | 0.75 | 0.75 | 0.75 | 0.75 | 0.75 |
| Dibutyl Tin Dilaurate | — | 0.1 | 0.2 | 0.5 | 1.0 |
| Weight | 39.9 | 39.9 | 39.8 | 40.0 | 40.0 |
| Compression | 62 | 60 | 59 | 57 | 58 |
| Coefficient of Restitution | .805 | .807 | .809 | .808 | .807 |
| Size (inches) | 1.545 | 1.545 | 1.545 | 1.545 | 1.545 |

DISCUSSION OF THE EXAMPLES

Examples 1 and 5 are controls in that no tin salt is used in accordance with this invention. The coefficient of restitutions for these examples are 0.797 and 0.805 respectively, for an average of 0.801, for a data base of 24 balls.

The data for examples 2, 3, 4, 6, 7, 8 and 9 represents the coefficient of restitutions for golf ball cores made in accordance with this invention. The data for these examples represents the test which were conducted on 98 golf ball cores. The coefficient of restitution for the average of these examples was 803.4.

As can be seen the average coefficient of restitution for the balls made in accordance with this invention is 2.4 points higher than the control balls of example 1 and 5. In practical terms, this increase of 3.4 points would amount to an increase of approximately 2 to 4 yards in the total distance over which a finished golf ball would travel, assuming that both balls use the same cover.

Further, it can be seen that the coefficient of restitution for the balls of examples 5 to 9 is higher than that of examples 1 to 4, this difference results from the fact that the overall composition of the cores of these two sets of data are different. Most significantly, the cores of examples 1 to 4 contain an inactive filler barytes which is replaced with an active filler zinc oxide in the cores of examples 5 to 9. Further, it is felt that the lower peroxide content of examples 5 to 9 as compared to the peroxide content of examples 1 to 4 has a beneficial affect on the coefficient of restitution.

It will be understood that the claims are intended to embrace all changes and modifications of the preferred embodiments of the invention, herein chosen for the purposes of illustration, which do not constitute departure from the spirit and scope of the invention.

What is claimed is:

1. An improved core composition for a golf ball exhibiting a high coefficient of restitution, said composition comprising a base elastomer selected from polybutadiene and mixtures of polybutadiene with other elastomers, said polybutadiene having a molecular weight of from about 50,000 to about 500,000, from about 20 to about 50 parts by weight of at least one metallic salt of an alpha, beta ethylenically unsaturated monocarboxylic acid, from about 0.1 to about 10 parts by weight of a free radical initiator and from about 0.1 to about 10 parts by weight of a dialkyl tin difatty acid of the formula:

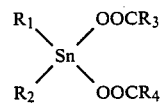

wherein $R_1$ and $R_2$ are lower alkyl having from 2 to 8 carbon atoms and $R_3$ and $R_4$ are alkyl having from 7 to 17 carbon atoms, said parts by weight based on 100 parts of elastomer.

2. The composition as defined by claim 1 wherein said polybutadiene is cis-polybutadiene having a molecular weight of from about 50,000 to about 500,000.

3. The composition as defined by claim 1 wherein said metallic salt is selected from the group consisting of acrylic acid, methacrylic acid, itaconic acid, crotonic acid, sorbic acid and mixtures thereof.

4. The composition as defined by claim 3 wherein said metallic salt is zinc diacrylate.

5. The composition as defined by claim 1 wherein said free radical initiator is selected from the group consisting of peroxides, persulfates, hydrazines and azo compounds.

6. The composition as defined by claim 4 wherein said initiator is a peroxide.

7. The composition as defined by claim 6 wherein said peroxide is selected from the group consisting of n- butyl-4,4-bis (butylperoxy) valerate, dicumyl peroxide, 1,1-bis-(t-butylperoxy)-3,3,5-trimethylcyclohexane, di-t-butyl peroxide and 2,5-di-(t-butylperoxy)-2,5-dimethylhexane.

8. The composition as defined by claim 1 wherein said dialkyl tin difatty acid is dibutyl tin dilaurate.

9. The composition as defined by claim 1 further comprising a modifying ingredient selected from fillers present in an amount of from about 10 to about 100 parts by weight, metal oxides, low molecular weight fatty acids present in an amount of from about 1 to about 15 parts by weight, diisocyanates present in an amount of from about 0.2 to about 5.0 parts by weight, and mixtures thereof based on 100 parts elastomer.

10. The composition as defined by claim 9 wherein said fatty acid is stearic acid.

11. The composition as defined by claim 9 wherein said diisocyanate is 4,4-diphenylmethane diisocyante.

12. The composition as defined by claim 9 wherein said metal oxide is zinc oxide.

13. A golf ball exhibiting a high coefficient of restitution, said golf ball comprising a molded, spherical core and a cover therefor, said core comprising a base elastomer selected from polybutadiene and mixtures of polybutadiene with other elastomers, said polybutadiene having a molecular weight of from about 50,000 to about 500,000, from about 20 to 50 parts by weight of at least one metallic salt of an alpha, beta ethylenically unsaturated monocarboxylic acid, from about 0.1 to about 10 parts by weight of a free radical initiator and from about 0.1 to about 10 parts by weight of a dialkyl tin difatty acid of the formula:

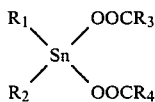

wherein $R_1$ and $R_2$ are lower alkyl having from 2 to 8 carbon atoms and $R_3$ and $R_4$ are alkyl having from 7 to 17 carbon atoms, said parts by weight based on 100 parts of elastomer.

14. The golf ball as defined by claim 13 wherein said elastomer is cis-polybutadiene.

15. The golf ball as defined by claim 13 wherein said cover comprises an ionic copolymer of ethylene and an alpha, beta ethylenically unsaturated monocarboxylic acid selected from the group consisting of acrylic and methacrylic acid wherein from about 20 to about 90 percent of the carboxylic acid groups are neutralized by a metal ion.

16. The gold ball as defined by claim 13 wherein said monocarboxylic acid is selected from the group consisting of acrylic acid, methacrylic acid, itaconic acid, crotonic acid, sorbic acid and mixtures thereof.

17. The golf ball as defined by claim 13 wherein crosslinking of said elastomer and said monocarboxylic acid is effected by a free radical initiator present in an amount of from about 0.1 to about 10 parts by weight based on 100 parts elastomer.

18. The golf ball as defined by claim 17 wherein said initiator is a peroxide.

19. The golf ball as defined by claim 18 wherein said peroxide is selected from the group consisting of n-butyl-4,4-bis (butylperoxy) valerate, dicumyl peroxide, 1,1-bis (t-butylperoxy)-3,3,5-triethylcyclohexane, di-ti-butyl peroxide and 2,5-di (t-butylperoxy)-2,5-dimethylhexane.

20. The golf ball as defined by claim 13 wherein said dialkyl tin difatty acid is dibutyl tin dilaurate.

21. The golf ball as defined by claim 13 wherein said core further comprises a modifying ingredient selected from fillers present in an amount of from about 10 to about 100 parts by weight, metal oxides, low molecular weight fatty acids present in an amount of from about 1 to about 15 parts by weight, diisocyanates present in an amount of from about 0.2 to about 5.0 parts by weight, and mixtures thereof, based on 100 parts elastomer.

22. The golf ball as defined by claim 21 wherein said fatty acid is stearic acid.

23. The golf ball as defined by claim 21 wherein said diisocyanate is 4,4-diphenylmethane diisocyanate.

24. The golf ball as defined by claim 21 wherein said metal oxide is zinc oxide.

* * * * *

UNITED STATES PATENT AND TRADEMARK OFFICE
CERTIFICATE OF CORRECTION

PATENT NO. : 4,844,471

DATED : July 4, 1989

INVENTOR(S) : Terence Melvin and Alfred I. LaRosa

It is certified that error appears in the above-identified patent and that said Letters Patent is hereby corrected as shown below:

On the title page, under item [19], "Terence et al." should be --Melvin et al.-- item [75], change the first inventor's name from "Melvin Terence" to --Terence Melvin--.

Signed and Sealed this

Tenth Day of July, 1990

*Attest:*

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,844,471
DATED : July 4, 1989
INVENTOR(S) : Terence Melvin & Alfred LaRosa It is certified that error appears in the above-indentified patent and that said Letters Patent is hereby corrected as shown below:

Title Page: Name of Patentee should be MELVIN;

(75) Inventors: Melvin Terence Should be TERENCE MELVIN

Signed and Sealed this

Second Day of November, 1999

Attest:

Q. TODD DICKINSON

Attesting Officer

Acting Commissioner of Patents and Trademarks